(12) United States Patent
Bhatia et al.

(10) Patent No.: US 9,544,140 B1
(45) Date of Patent: Jan. 10, 2017

(54) MULTI-LEVEL KEY HIERARCHY FOR SECURING CLOUD-BASED DATA SETS

(75) Inventors: Manish Ramesh Bhatia, Maharashtra (IN); Praveen Reddy, Hyderabad (IN); Phanikumar Bhamidipati, Hyderabad (IN)

(73) Assignee: Amazon Technologies, Inc., Seattle, WA (US)

( * ) Notice: Subject to any disclaimer, the term of this patent is extended or adjusted under 35 U.S.C. 154(b) by 1140 days.

(21) Appl. No.: 13/171,317

(22) Filed: Jun. 28, 2011

(51) Int. Cl.
*H04L 9/08* (2006.01)

(52) U.S. Cl.
CPC ........... *H04L 9/0891* (2013.01); *H04L 9/0836* (2013.01); *H04L 9/0822* (2013.01)

(58) Field of Classification Search
None
See application file for complete search history.

(56) References Cited

U.S. PATENT DOCUMENTS

| | | | | |
|---|---|---|---|---|
| 2005/0138374 A1* | 6/2005 | Zheng et al. | ................. | 713/166 |
| 2005/0238175 A1* | 10/2005 | Plotkin et al. | ................. | 380/281 |
| 2008/0130880 A1* | 6/2008 | Frindell et al. | ................. | 380/45 |
| 2009/0319772 A1* | 12/2009 | Singh et al. | ................. | 713/153 |
| 2010/0095118 A1* | 4/2010 | Meka | ........................... | 713/168 |

\* cited by examiner

*Primary Examiner* — Jung Kim
*Assistant Examiner* — Adrian Stoica
(74) *Attorney, Agent, or Firm* — Thomas | Horstemeyer, LLP

(57) ABSTRACT

A hierarchy is defined that includes encryption keys associated with different first and second levels of the hierarchy, where the second level includes fewer of the encryption keys than the first level. The encryption keys of the first level secure a plurality of data objects. The encryption keys of the first level are grouped into key groups that respectively include one or more of the encryption keys of the first level. The one or more of the encryption keys of the first level included in each of the key groups are secured with a respective one of the encryption keys of the second level.

25 Claims, 5 Drawing Sheets

MULTI-LEVEL KEY HIERARCHY FOR SECURING CLOUD-BASED DATA SETS

BACKGROUND

Cloud computing includes the provision of computational resources on demand via a computer network. The resources can be embodied as various infrastructure services (e.g. compute, storage, etc.) as well as applications, databases, file services, email, etc. In the traditional model of computing, both data and software are typically fully contained on the user's computer; in cloud computing, the user's computer may contain little software or data (perhaps an operating system and/or web browser), and may serve as little more than a display terminal for processes occurring on a network of external computers. A cloud computing service (or an aggregation of multiple cloud resources) may be generally referred to as the "Cloud".

Cloud storage may include a model of networked computer data storage where data is stored on multiple virtual servers, rather than being hosted on dedicated servers. Hosting companies may operate large data centers, and customers who desire their data to be hosted may buy or lease storage capacity from them to meet storage needs. The data center operators, in the background, may virtualize the resources according to the requirements of the customer and expose them as virtual servers, which the customers can themselves manage. Physically, the resource may span across multiple servers.

The expected proliferation of cloud computing and data storage is a consideration in designing highly scalable systems with lesser total cost of ownership (TCO), and security may be a concern for organizations to start storing their data in the cloud. However, known encryption practices and algorithms may be less than ideal for use with a cloud-based system, in light of the size and rate of growth of the data. In particular, such encryption algorithms may be limited in the ability to scale dynamically for higher volumes of data, and thus, may not be feasible for use in a system built on a cloud infrastructure. Also, as such encryption practices may require frequent rotation of encryption keys, these approaches may result in service level agreements (SLAs) that grow along with data size.

DETAILED DESCRIPTION

Figure 1:
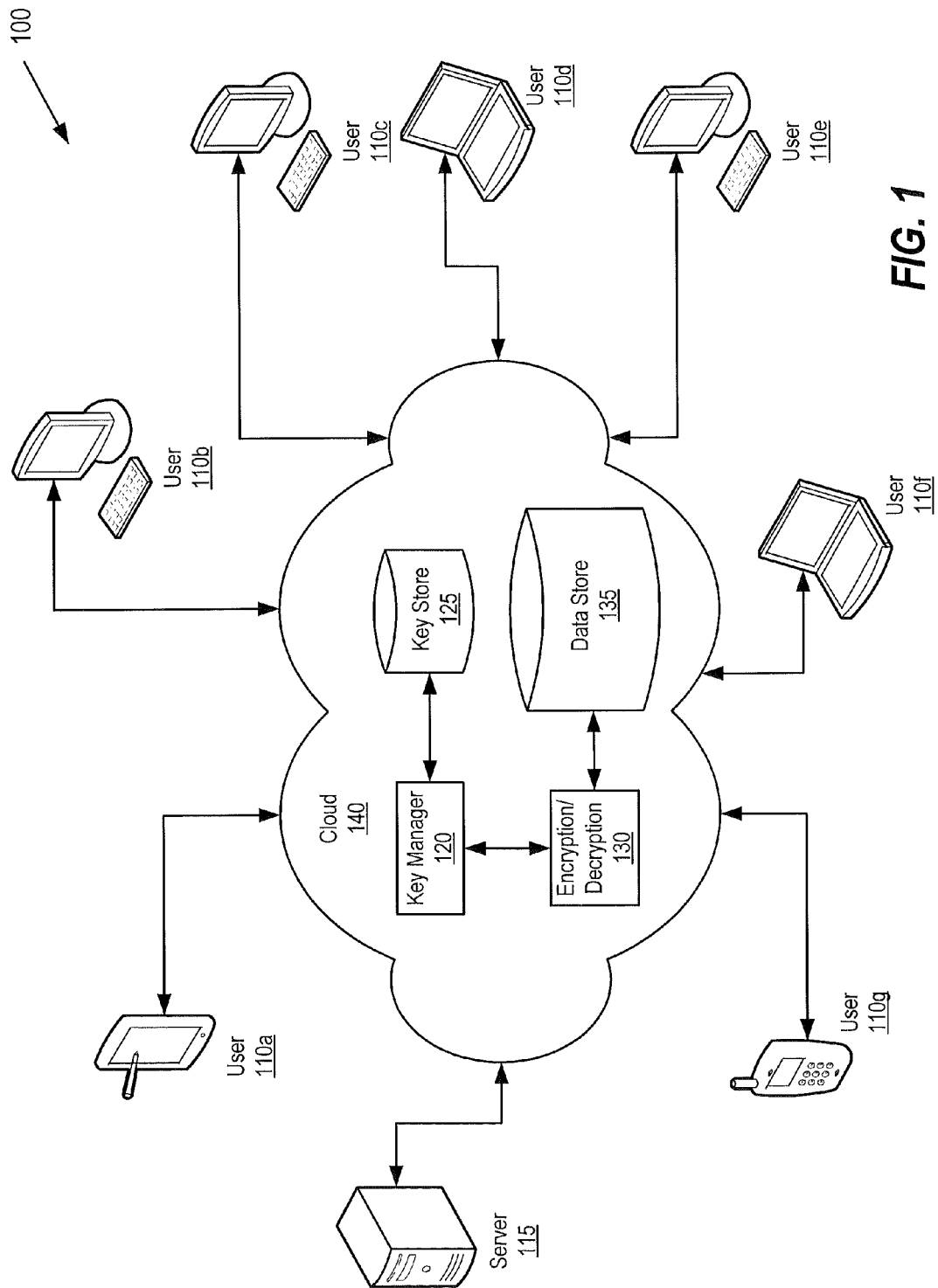
FIG. 1 is a block diagram of systems, devices, methods and computer program products for securing data in a cloud-based storage system, according to various embodiments described herein.

Various embodiments described herein provide methods and systems for securing cloud-based data storage systems by encrypting data using multi-level, hierarchically arranged cryptographic keys (also referred to herein as encryption keys). Such a hierarchy may employ standard encryption/decryption algorithms to encrypt/decrypt data, and may scale well as data sets grow larger, as is expected in a cloud-based storage environment. New keys can be generated dynamically and added to one or more levels of the hierarchy as data sets grow, so that growing data sets can be accommodated without interfering with previously-stored data sets and/or existing encryption keys.

There are several approaches for securing data stored in cloud-based data stores. For example, for data where security is not a concern, such data may be stored without encryption. Such cloud-based data storage systems may still provide some security features such as credentials, signature support, and filtering based on requestor identification, and thus, may have reduced or minimal complexity at the software layers above. However, as the stored data is not encrypted, such an approach is typically not suitable for data classified as secret and above.

Another approach involves securing the data with one or more cryptographic keys. There are multiple approved standards for encryption with standard libraries, such as RSA for public key based encryption, and AES for symmetric key based approaches. The standard libraries may include the code and algorithms used for encryption. However, such encryption methods may be limited in that, if a key used to encrypt the stored data is compromised, all data secured using that key may be at risk.

Accordingly, key rotation is a generally practiced approach when securing data with encryption keys. Key rotation may be defined as the process of decrypting data with the original key used to encrypt the data, and re-encrypting the data with a new, different key that replaces the original key (also referred to herein as a replacement key). The National Institute of Standards and Technology provides definitions of appropriate key lengths and provides guidelines for how long keys should be used. The PCI Data Security Standard is another example of a compliance initiative with requirements for encryption key rotation. However, as key rotation typically requires all secured data to be downloaded, decrypted with the old key, re-encrypted with a replacement key, and re-uploaded again to the data store, such an approach may be costly and time-consuming due to the computational resources needed, especially for archived data that is relatively large but not read frequently.

To somewhat lessen this burden, a range or set of data objects may be divided and encrypted using multiple keys instead of one. However, large data sets that need to be preserved for long time, such as consumer data stored in the cloud, may still require periodic key rotation to maintain the security of the data sets. As such, downloading, decrypting, re-encrypting, and re-uploading such large data sets may become costlier as the size of the data increases, which may increase costs associated with cloud-based storage. Also, some companies may wish to support multiple compliance initiatives simultaneously, which adds to the complexity and frequency of key rotation.

In light of the above, embodiments as described herein provide a hierarchy of encryption keys at different levels, where a smaller number or quantity of keys at one level of the hierarchy are used to secure a greater number or quantity of keys at another level of the hierarchy. Such an approach may significantly reduce the cost and complexity of key rotations, as rotation of keys at the higher levels of the hierarchy (e.g., levels having the smaller number of keys) may require the decryption and re-encryption of a smaller number of objects (e.g., the greater number of keys at the next lower level of the hierarchy, rather than the entire set of stored data objects) while still meeting key rotation compliance initiatives.

Overall Architecture for Securing Data Sets in the Cloud

FIG. 1 is a block diagram of systems, devices, methods and computer program products for securing data in a cloud-based storage system according to various embodiments described herein. Referring now to FIG. 1, a communications environment or system 100 may include a plurality of user devices 110a-110g and a server 115 configured for data storage and/or other communication with a storage cloud 140. The plurality of user devices 110a-110g may be wired or wireless communication terminals, such as desktop computers, laptop computers, cellular telephones, smartphones, electronic book readers, tablets and the like, and may be configured to access the storage cloud 140 via wired or wireless connections. In some embodiments, the user devices 110a-110g may include relatively little internally-stored software or data, and may rely on interaction with the cloud 140 for at least some processing and/or data management. Although not specifically illustrated, the user devices 110a-110g and the server 115 may connect to the cloud 140 via one or more infrastructure elements (e.g., base stations, switches, etc.), the details of which are known in the art and need not be described further herein.

The cloud 140 includes a cloud-based data store 135 configured to store a plurality of data objects therein. As used herein, the term "cloud-based data store" refers to the storage of data on one or more virtual servers in a computing environment external to the devices 110a-110g and 115. The data store 135 may physically span across multiple servers and/or databases (not shown) in some embodiments. The data objects stored in the data store 135 may include any data associated with or otherwise provided by one or more of the user devices 110a-110g and/or the server 115 for external storage in the cloud 140. For example, in some embodiments where the server 115 is associated with a financial service provider, the data objects may be financial data associated with one or more of the users of the devices 110a-110g as collected by the server 115. In other embodiments where the server 115 is associated with an online shopping service provider, the data objects may be shopping cart data associated with one or more of the users of the devices 110a-110g. In still other embodiments where the server 115 is associated with a service for downloading multimedia items, the data objects may be movies, songs, and/or games acquired by one or more of the users of the devices 110a-110g from the server 115.

Still referring to FIG. 1, the storage cloud 140 further includes an encryption key store 125 configured to generate and store a plurality of different encryption key objects (generally referred to herein as "encryption keys"), an encryption key manager 120 configured to manage the encryption keys in a hierarchical manner, and an encryption/decryption module 130 configured to secure the data objects in the data store 135 using the encryption keys provided by the key manager 120. In particular, the key manager 120 is configured to define a hierarchy for the encryption key objects stored in the key store 125, where ones of the encryption key objects are associated with different levels of the hierarchy such that each level of the hierarchy includes a different number of key objects. For example, a second or higher level of the hierarchy may include fewer key objects than a first or lower level.

According to embodiments described herein, in such a hierarchy, the data objects stored in the data store 135 may be secured by the encryption keys of the first level. In particular, the encryption/decryption module 130 accesses the data store 135, retrieves the data objects stored therein, and groups or divides the data objects into respective data groups, where each data group includes multiple ones of the data objects. The key manager 120 thereby assigns a different one of the first level encryption keys to each of the respective data groups based on the defined hierarchy, and the encryption/decryption module 130 secures the data objects in each of the respective data groups with the one of the first-level encryption keys assigned to that data group and stores the secured data objects in the data store 135.

Still referring to FIG. 1, the first-level encryption keys may be further secured by the relatively smaller number of second-level encryption keys. In particular, in accordance with the hierarchy defined by the key manager 120, the encryption/decryption module 130 retrieves the encryption keys from the key store 125, and groups or divides the first-level encryption keys into respective key groups, where each key group includes one or more of the first-level encryption keys. The key manager 120 thereby assigns a different one of the second-level encryption keys to each of the respective key groups based on the defined hierarchy, and the encryption/decryption module 130 secures the first-level encryption keys in each of the respective key groups with the one of the second-level encryption keys assigned to that key group and stored the secured first-level keys in the key store 125.

Accordingly, when secured in such a hierarchical manner, some instances of key rotation may be performed without decrypting all of the data objects stored in the data store 130. In particular, to rotate the second-level encryption keys, the encryption key manager 120 need only direct the encryption/decryption module 130 to retrieve or download the first-level keys from the key store 125, decrypt the first-level keys using the second-level keys, re-encrypt the first-level keys with a different set of second-level keys, and upload the re-encrypted first level keys to the key store 125.

Thus, when using hierarchical key arrangements in accordance with some embodiments described herein, key rotation may be performed more quickly at the higher levels (for example, at a highest level k), as only the objects at the next level down (e.g., the keys at level k−1, rather than the plurality of data objects) need to be downloaded and decrypted. In other words, key rotation may be performed at one or more higher levels of the hierarchy without downloading and decrypting the plurality of data objects, which may be associated with the lowest level (or leaf level) of the hierarchy.

Although FIG. 1 illustrates an example communications environment 100 in accordance with some embodiments, it will be understood that the present disclosure is not limited to such a configuration but is intended to encompass any configuration capable of carrying out the operations described herein. For example, although illustrated in FIG. 1 with reference to separate data stores 125 and 135 for the keys and data objects, respectively, the first-level keys, the second-level keys, and/or the data objects may be stored in a common storage system in some embodiments. Also, while described with reference to particular operations performed by the key manager 120 and the encryption/decryption module 130, it will be understood that the cloud 140 may include a plurality of distributed network elements that collectively perform some or all of the operations described herein. More generally, various functionality described herein in separate functional elements may be combined within a single functional element, and, vice versa, functionality described herein in a single functional element can be carried out by a plurality of separate functional elements.

Use-Case Example: Hierarchy Including Two-Levels of Cryptographic Keys

Figure 2:
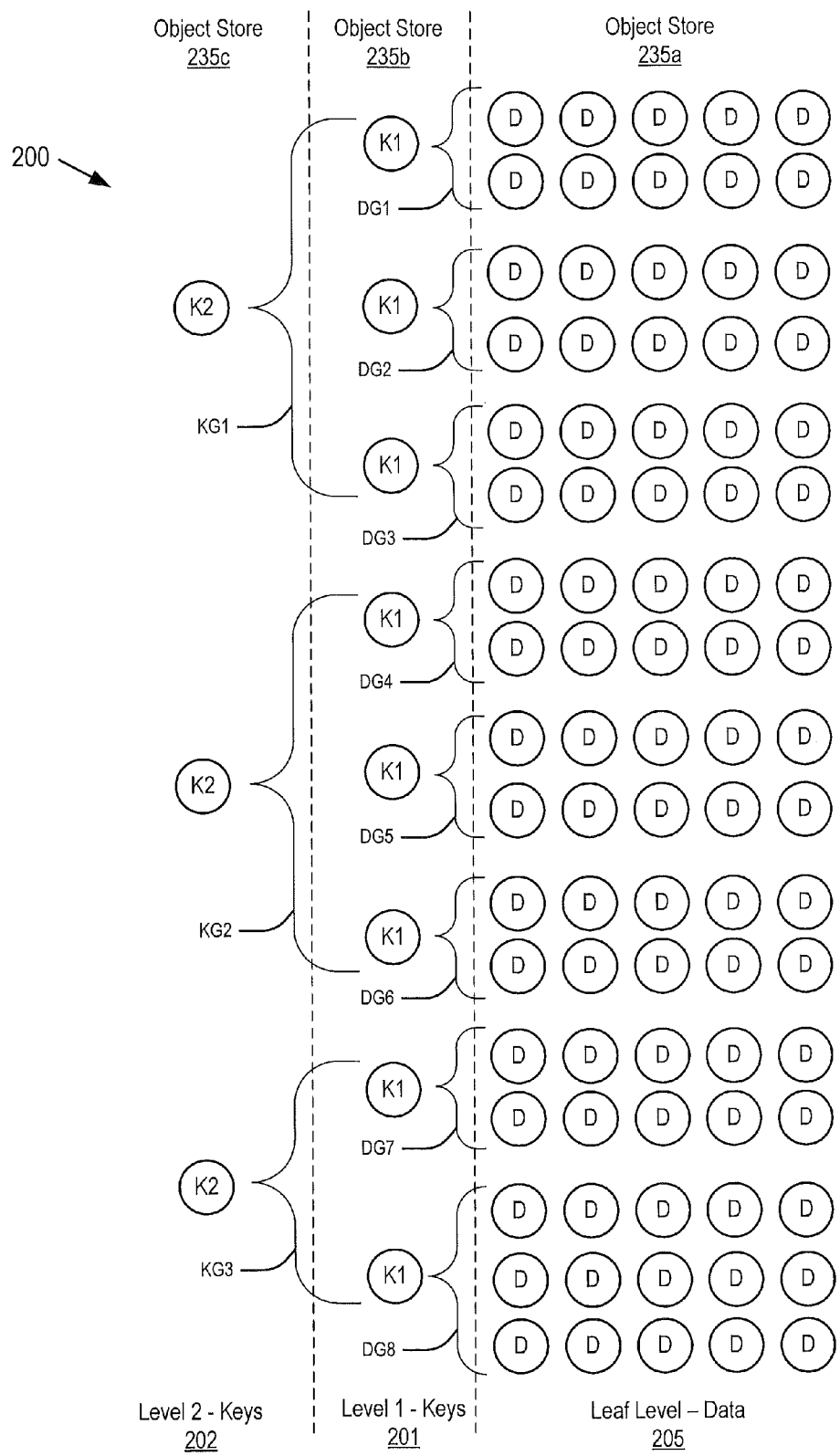
FIG. 2 illustrates an example of a multi-level hierarchy for securing data in cloud-based data storage systems according to some embodiments described herein.
Figure 3:
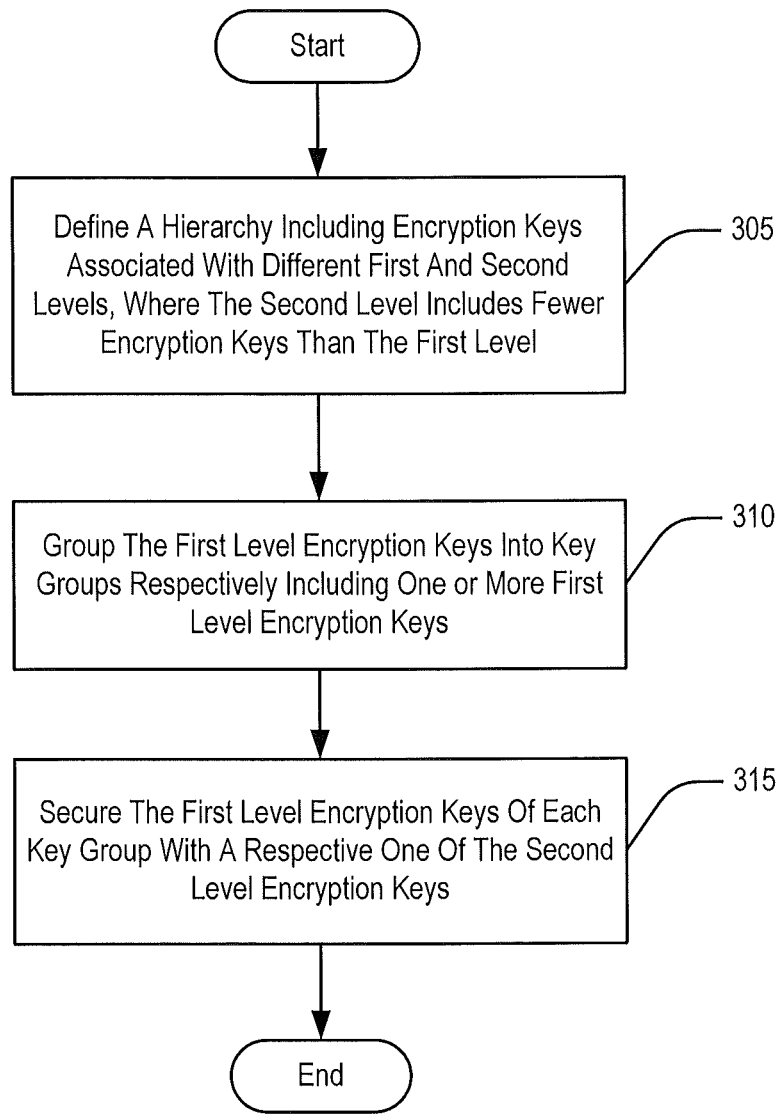
FIG. 3 is a flowchart of operations for securing data in a cloud-based storage system according to some embodiments described herein.

FIG. 2 is a diagram illustrating an example two-level key hierarchy according to some embodiments disclosed herein. FIG. 3 is a flowchart illustrating example operations for securing data in a cloud-based storage system using such a two-level key hierarchy. In some embodiments, the operations of FIG. 3 may be performed by the encryption key manager 120 and/or the encryption/decryption module 130 of FIG. 1. Referring now to FIGS. 2 and 3, a hierarchy 200 is defined including a plurality of encryption keys K1 associated with a first level 201 of the hierarchy 200, and a plurality of encryption keys K2 associated with a second level 202 of the hierarchy 200 (block 305). The second level 202 of the hierarchy 200 includes fewer encryption keys than the first level 201. The keys K1 and K2 may be dynamically generated as needed based on the defined hierarchy 200, the number of data objects D to be secured, and/or any security needs. Also, keys may be dynamically added to one or more of the levels 201 and 202 as new data objects D are added, such that the hierarchy 200 may be scaled in accordance with data growth. Although the keys at a particular level 201 or 202 are illustrated using the same reference designators K1 or K2 in FIG. 2, it will be understood that each of the illustrated keys K1 and K2 may represent a different numeric string. In other words, the keys K1 and K2 shown in FIG. 2 may each represent different keys. Likewise, the data objects D may each represent different data. The keys of a particular level of the hierarchy 200 may have the same or different key lengths (for example, as measured in bits).

The encryption keys K1 of the first level 201 of the hierarchy 200 are used to secure a larger number of data objects D associated with a lowest level 205 (also referred to herein as a "leaf" level) of the hierarchy 200. In particular, as shown in FIG. 2, the data objects D are divided or grouped into multiple data groups DG1-DG8, such that each of the data groups DG1-DG8 includes multiple data objects D. Each of the data groups DG1-DG8 is assigned or otherwise associated with a different one of the encryption keys K1 of the first level 201, and each of the data objects D is secured by the one of the encryption keys K1 assigned to the data group DG1-DG8 to which that data object D belongs. The secured data objects D are stored in a data store, such as the data store 135 of FIG. 1. As illustrated in FIG. 2, the data groups DG1-DG8 need not each include the same number of data objects D; however, one or more of the data groups DG1-DG8 may include a same number of data objects D in some embodiments.

The encryption keys K2 of the second level 202 of the hierarchy 200 are used to secure the larger number of encryption keys K1 of the first level 201. In particular, as shown in FIGS. 2 and 3, the encryption keys K1 of the first level 201 are divided or grouped into multiple key groups KG1-KG3, such that each of the key groups KG1-KG3 includes one or more of the encryption keys K1 of the first level 201 (block 310). Each of the key groups KG1-KG3 is assigned or otherwise associated with a different one of the encryption keys K2 of the second level 202, and each of the first-level encryption keys K1 is secured by the one of the second-level encryption keys K2 assigned to the key group KG1-KG3 to which that key K1 belongs (block 315).

Based on the hierarchy 200 of FIG. 2, the second-level encryption keys K2 may be rotated without downloading, decrypting, and re-encrypting all of the data objects D. In particular, the second-level encryption keys K2 may be rotated by retrieving and decrypting the first-level encryption keys K1 using the corresponding ones of the second-level encryption keys K2 assigned to the key groups KG1-KG3, generating and assigning replacement second-level keys K2' (not shown) to each of the key groups KG1-KG3, and re-encrypting the first-level encryption keys K1 in each of the respective groups KG1-KG3 using the replacement second-level key K2' assigned thereto. In some embodiments, the first-level keys K1 may be further re-grouped into new key groups (e.g., different than the key groups KG1-KG3) prior to assigning the replacement second-level keys K2' thereto.

For example, in response to detecting a breach of one or more of the second-level encryption keys K2, the key manager 120 of FIG. 1 may rotate only the encryption keys K2 of the second level 202 by downloading, decrypting, and re-encrypting the first-level keys K1 secured by the second level keys K2, without rotating the keys K1 of the first level 201. Rotating the keys K1 of the first level 201 would be significantly more computationally intensive and time consuming, as it would require downloading, decrypting, and re-encrypting all of the data objects D secured by the keys K1, where the data objects D may include a significantly larger number of objects than the key objects K1. However, it will be understood that the encryption keys K1 of the first level 201 may still be rotated in accordance with embodiments described herein to meet key rotation requirements or security standards, albeit less often or at a reduced frequency relative to the keys K2 of the second level 202. Such key rotation requirements and/or security standards may be specified by a service level agreement (SLA), which is a contractual agreement between providers and consumers of storage that governs performance, security, availability, recoverability, costs, and other business metrics associated with providing a cloud-based computing and/or storage service. For example, the encryption keys K1 of the first level 201 may be rotated periodically and/or at predetermined times after several rotations of the encryption keys K2 of the second level 202, as needed to comply with the requirements of any existing SLAs or other compliance initiatives for providing the cloud-based storage services described herein.

Also, additional keys may be dynamically generated and added at one or more of the levels 201 and 202 of the hierarchy 200 to support the addition of new data objects at the leaf level 205. The newly-added data objects at the leaf level 205 may be encrypted using one or more additional keys added at the first level 201, and the additional key(s) at the first level 201 may be grouped and secured by one or more additional keys added at the second level 202. As such, new data objects may be added without downloading, decrypting, and/or re-encrypting the previously stored data objects D. In other words, the newly-added data objects may be secured using new keys, while the previously stored data objects D are still secured by the pre-existing keys K1 and K2.

Still referring to FIG. 2, the keys K1 and K2 and the data objects D may be stored in one or more cloud-based object stores 235a-235c, one or more of which may be included in the key store 125 or the data store 135 of FIG. 1. From a storage perspective, the keys K1 and K2 and the data objects D may be generally considered as objects, where objects associated with the leaf level 205 of the hierarchy 200 are data objects D, and objects associated with the other levels 201 and 202 are cryptographic keys. Each of the data objects D and the key objects K1 and K2 may include metadata that identifies the object as either a data object or a key object. The keys K1 and/or K2 may be stored in the same storage system as the data objects D in some embodiments. The first-level keys K1, second-level keys K2, and/or the data objects D may be stored in different storage systems in some embodiments.

Accordingly, as shown in FIGS. 2 and 3, data objects D can be protected by standard credentials provided by the data store, and multiple levels of keys can be used to encrypt/decrypt the data objects based on the hierarchy 200. Thus, key rotation will be faster at higher levels (e.g., the second level 202 of FIG. 2), due to the fewer number of objects to be retrieved, decrypted, and re-encrypted. Also, because the data objects D are secured by key objects K1 of the first level 201, and the key objects K1 of the first level 201 are secured by key objects K2 of the second level 202, the time required to rotate keys does not increase linearly with the number of data objects D stored at leaf level 205. Systems according to embodiments described herein may thereby operate independent of the choice of algorithms used for encryption/decryption of the data, and may be used with any encryption/decryption algorithms so long as the encryption/decryption keys are hierarchically arranged as described herein.

Furthermore, additional keys may be dynamically generated and added to the first level 201 and/or to the second level 202 as additional data objects are stored at the leaf level 205 to provide or maintain a desired key-to-data ratio in accordance with security requirements or restrictions. As described herein, the key-to-data ratio may refer to the number or quantity of key objects (at one or more levels of the hierarchy) relative to the number of data objects stored. A key-to-key ratio, in contrast, may refer to the number/quantity of keys at one level of the hierarchy relative to the number/quantity of keys at another level of the hierarchy. Key objects described herein may be dynamically generated to provide or maintain both a desired key-to-data ratio and a desired key-to-key ratio in some embodiments. In particular, the number of the encryption keys associated with each of the first and second levels 201 and 202 may be chosen to provide a desired key-to-data ratio and/or key-to-key ratio, which may vary based on the security level associated with ones of the data objects D. For example, ones of the data objects D having a higher security level or tier (such has financial data) than other data objects D (such as shopping cart data) may require a higher key-to-data ratio, and thus, may be divided into more groups of fewer data objects D and/or may otherwise be secured by a greater number of keys K1 at the first level 201 than ones of the data objects D having a lower security level. Also, additional levels may be added to the hierarchy 200 to provide the desired or required key-to-data ratio and/or key-to-data ratio for higher-security data objects and/or to allow for more frequent key rotation without retrieving as many objects. A hierarchy including more than two levels of encryption keys is discussed in greater detail below with reference to FIG. 4.

Use-Case Example: Hierarchy Including k-Levels of Cryptographic Keys

Figure 4:
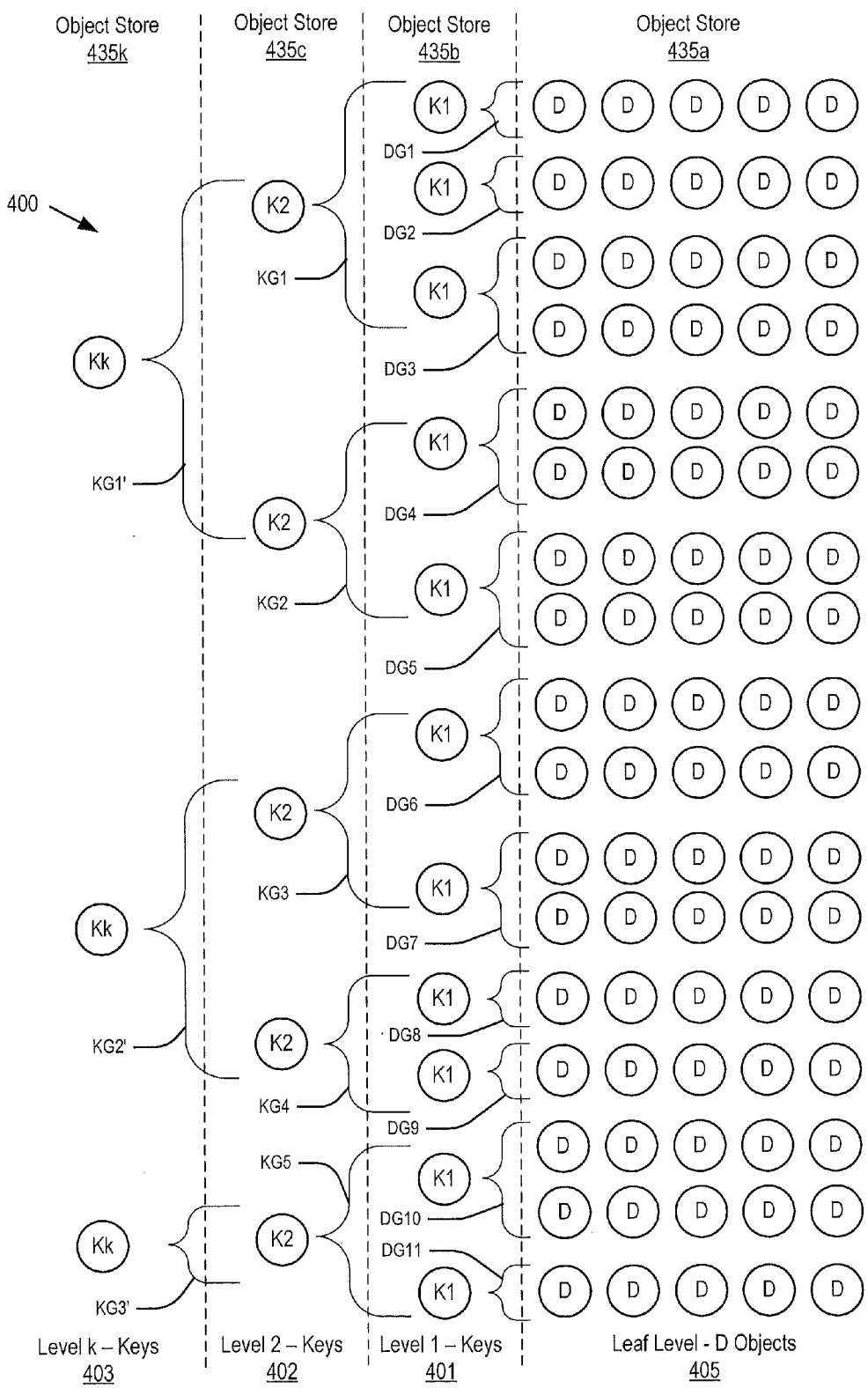
FIG. 4 illustrates an example of a multi-level hierarchy for securing data in a cloud-based storage system according to further embodiments described herein.
Figure 5:
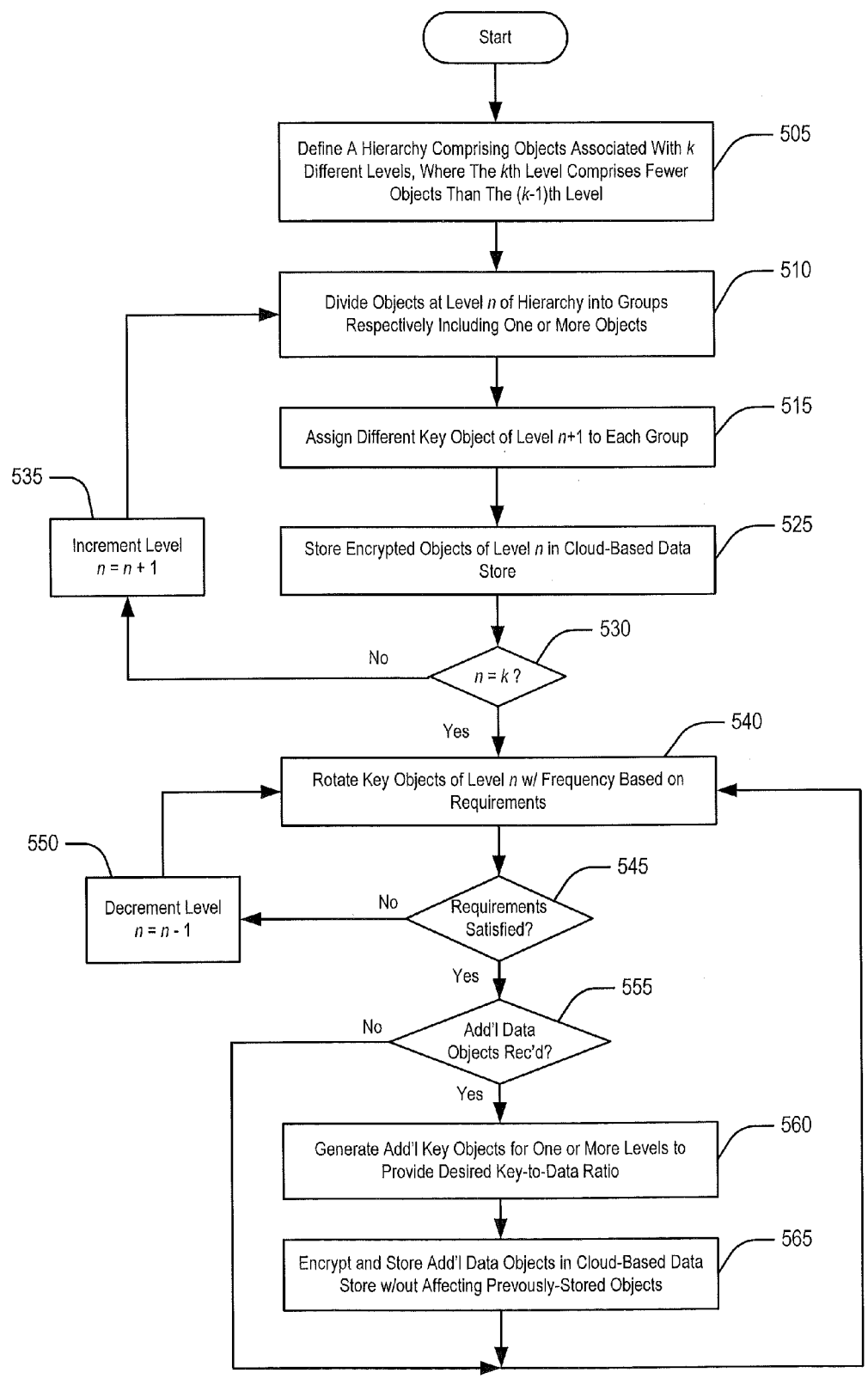
FIG. 5 is a flowchart of operations for securing data in a cloud-based storage system according to further embodiments described herein.

FIG. 4 is a diagram illustrating an example k-level key hierarchy according to some embodiments disclosed herein, where k is an integer greater than 1. FIG. 5 is a flowchart illustrating example operations for securing data in a cloud-based storage system using such a k-level key hierarchy. In some embodiments, the operations of FIG. 5 may be performed by the encryption key manager 120 and/or the encryption/decryption module 130 of FIG. 1. Referring now to FIGS. 4 and 5, a hierarchy 400 is defined including a plurality of encryption keys K1 associated with a first level 401 of the hierarchy 400, a plurality of encryption keys K2 associated with a second level 402 of the hierarchy 400, and a plurality of encryption keys Kk associated with a $k^{th}$ level 403 of the hierarchy 400 (block 505). The second level 402 of the hierarchy 400 includes fewer encryption keys K2 than the first level 201, and the $k^{th}$ level 403 of the hierarchy 400 includes fewer encryption keys Kk than the second level 402. More generally, the hierarchy 400 may include k different levels, where the $k^{th}$ level includes fewer keys than a $(k-1)^{th}$ level. The keys K1, K2, . . . Kk may be dynamically generated as needed based on the defined hierarchy 400, the number of data objects D to be secured, and/or any security needs. Although the keys at a particular level 401, 402, or 403 are illustrated using the same reference designators K1, K2, . . . Kk in FIG. 4, it will be understood that each of the illustrated keys may represent a different string of numbers. In other words, the keys designators K1, K2, . . . Kk shown in FIG. 4 may each represent different keys. Likewise, the data objects D may each represent different data. Also, the keys of a particular level of the hierarchy 400 may have the same or different key lengths.

The encryption keys K1 of the first level 401 of the hierarchy 400 are used to secure a plurality of data objects D associated with a lowest level 405 (also referred to herein as a "leaf" level) of the hierarchy 400. Accordingly, the keys K1, K2, and Kk and the data objects D may be generally considered as objects, where objects associated with the leaf level 405 of the hierarchy 400 are data objects D, and objects associated with the other levels 401, 402, and 403 are cryptographic keys. Each of the data objects D and the key objects K1, K2, and Kk may include metadata that identifies the object as either a data object or a key object.

Referring to FIGS. 4 and 5, the objects at a particular level n of the hierarchy (where n is an integer greater than or equal to zero) are divided or grouped into groups respectively including one or more objects (block 510). In particular, at the leaf level 405, the data objects D are divided or grouped into multiple data groups DG1-DG11, where each of the data groups DG1-DG11 includes one or more data objects D. Each of the data groups DG1-DG11 is assigned or otherwise associated with a different one of the encryption keys of the next level n+1 (here, the encryption keys K1 of the first level 401) (block 515), and each of the data objects D at the leaf level 405 is encrypted using the one of the encryption keys K1 assigned to the data group DG1-DG11 to which that data object D belongs. The encrypted data objects D are stored in a cloud-based object store 435a (block 525), such as the data store 135 of FIG. 1.

The encryption keys K2 of the second level 402 of the hierarchy 400 are used to secure the encryption keys K1 of the first level 401. In particular, as shown in FIGS. 4 and 5, the current level n of the hierarchy is incremented to the next level n+1 up from the leaf level 405 (e.g., the first level 401) (blocks 530 and 535), and the encryption keys K1 of the first level 401 are divided or grouped into multiple key groups KG1-KG5, where each of the key groups KG1-KG5 includes one or more of the encryption keys K1 of the first level 401 (block 510). Each of the key groups KG1-KG5 is assigned or otherwise associated with a different one of the encryption keys K2 of the second level 402 (block 515), where each of the first-level encryption keys K1 is secured by the one of the second-level encryption keys K2 assigned to the key group KG1-KG5 to which that key K1 belongs. The encrypted keys K1 are stored in a cloud-based data store 435b (block 525), such as the key store 125 of FIG. 1.

Likewise, the encryption keys Kk of the k$^{th}$ level 403 of the hierarchy 400 are used to secure the encryption keys K2 of the second level 402. In particular, the current level n of the hierarchy is incremented to the next level n+1 up from the first level 401 (e.g., the second level 402) (blocks 530 and 535), and the encryption keys K2 of the second level 402 are divided or grouped into multiple key groups KG1'-KG3', where each of the key groups KG1'-KG3' includes one or more of the encryption keys K2 of the second level 402 (block 510). Each of the key groups KG1'-KG3' is assigned or otherwise associated with a different one of the encryption keys Kk of the k$^{th}$ level 403 (block 515), where each of the second-level encryption keys K2 is secured by the one of the k$^{th}$ level encryption keys Kk assigned to the key group KG1'-KG3' to which that key K2 belongs. The encrypted keys K2 are stored in a cloud-based data store 435c (block 525), such as the key store 125 of FIG. 1.

Still referring to FIG. 5, the keys of the particular level n of the hierarchy are rotated to meet desired rotation or security requirements (block 540), for example, in accordance with the requirements of a service level agreement (SLA). Where possible, the rotation requirements are met by rotating keys at the upper levels (e.g., levels greater than the first level 401), which may be performed without downloading and decrypting and re-encrypting all of the data objects D at the leaf level 405 (which would be significantly more time consuming and computationally intensive). If it is determined that key rotation at the upper levels of the hierarchy 400 do not satisfy the existing requirements (at block 545), the current level n of the hierarchy is decremented to the next lower level n–1 (block 550), and the key objects of the next lower level are rotated to meet the existing requirements (block 540).

For example, in order to comply with an existing SLA, the key manager 120 of FIG. 1 may be configured to rotate the encryption keys Kk of the k$^{th}$-level 403 every 90 days, and to rotate the encryption keys K2 of the second level 402 every 2 years. As such, the key manager 120 may rotate the encryption keys Kk of the k$^{th}$-level 403 (block 540) by downloading, decrypting, and re-encrypting only the second-level 402 keys K2 that are secured by the k$^{th}$-level 403 keys Kk (e.g., without downloading, decrypting, and re-encrypting the first level 401 encryption keys K1 and/or leaf level 405 data objects D) every 90 days to satisfy the requirements of the existing SLA (block 545). At every 2$^{nd}$ year, the requirements of the SLA may not be satisfied by rotating the k$^{th}$-level 403 keys Kk (block 545), and thus, the key manager 120 may rotate the keys of the next lower level n–1 (e.g., the second-level 402 keys K2) by downloading, decrypting, and re-encrypting the first-level 401 keys K1 that are secured by the second-level 402 keys K2 (e.g., without downloading, decrypting, and re-encrypting the leaf level 405 data objects D). It will be understood, however, that the encryption keys K1 of the first level 401 may still be rotated in accordance with embodiments described herein to meet key rotation requirements or security standards, but less often or at a reduced frequency relative to the keys K2 of the second level 402. Likewise, the keys K2 of the second level 402 are rotated less often or at a reduced frequency relative to the keys Kk of the k$^{th}$ level 403. Thus, downloading, decrypting, and re-encrypting operations may be performed less frequently and using fewer keys, while maintaining a same or similar level of security and/or otherwise complying with existing key rotation and security requirements.

The number of levels k of the hierarchy 400 and/or the number of the encryption keys K1, K2, and Kk associated with each level 401, 402, and 403 of the hierarchy 400 may be selected based on a security level of one or more of the data objects D to provide a desired key-to-data ratio or key-to-key ratio. In particular, one or more of the data objects D may have different security requirements based on the type of information stored therein, and each security level may have its own key ratio requirement. For example, data objects associated with financial data or other sensitive user information may require higher degree of security than data objects associated with a user's multimedia collection. Such higher-security data objects may thus have different standards/requirements for frequency of key rotation, and may require more keys and/or more levels of keys to provide a higher key-to-data ratio or key-to-key ratio. For instance, shopping cart data may require 1 key for every 1000 shopping cart data objects, while personal financial data may require 1 key for every 10 financial data objects. Thus, the hierarchy may be defined (block 505) to include a particular number of levels (and/or a particular quantity of key objects at each level) based on the type and security tier of the data objects D to be stored in the cloud based data store.

In addition, the desired key-to-data ratio or key-to-key ratio may be maintained as new data objects are added (e.g., to keep up with expansion/growth of the cloud-based data store) by dynamically altering the number of levels and/or the quantity of key objects at each level of the hierarchy 400. In particular, it is determined whether additional data objects are received (block 555), and, if so, one or more additional key objects are generated (block 560). One or more of the additional data objects may have different security level associated therewith. The additional key objects may be added to one or more existing levels of the hierarchy 400, and/or additional key levels may be added to the hierarchy 400 as needed to maintain the desired key-to data or key-to-key ratio, based on the security level(s) of the additional data objects. The additional key objects of the first level 401 are used to encrypt the additional data objects, and the encrypted data objects are stored in the cloud based data store without affecting the previously-stored data objects (block 565). The additional key objects of the second level 402 secure the additional key objects of the first level 401, and the additional key objects of the k$^{th}$ level 403 secure the additional key objects of the second level 402 without affecting the previous key objects of the first, second, or third levels 401, 402, or 403. The number of levels of the hierarchy may also be dynamically altered to maintain the desired ratio(s). As such, new keys and/or levels may be dynamically added to the hierarchy 400 without interfering with the existing keys, groupings, and/or levels. In some embodiments, the key objects at one or more levels of the hierarchy 400 may be re-grouped to incorporate the additional key objects into the hierarchy.

Hierarchical key arrangements in accordance with embodiments described herein may be used to comply with standards for key rotation using a reduced number of keys (and thus, at a lower cost), as illustrated in the example below.

Example Cost Model for Hierarchy Including Two-Levels of Cryptographic Keys

The following cost model provides an example of the savings provided by embodiments described herein employing a three-level hierarchy 200 as illustrated in FIG. 2. The hierarchy 200 in the present example includes two levels 201 and 202 storing key objects K1 and K2, respectively, and a lowest/leaf level 205 storing data objects D. Level 1 201 keys K1 were stored in the same storage system as the data objects D at the leaf level 205, and Level 2 202 keys K2 were stored in a different key storage system. As used herein, a storage system may refer to any system that is capable of storing and retrieving the keys and/or the data objects described herein.

In the present example, the total number of data objects D stored in the cloud-based data store is 440,000,000 (440M). The data objects D were divided into groups, and 432,000 Level 1 keys K1 were used to secure the 440M data objects D. The Level 1 keys K1 were also divided into groups, and three Level 2 keys K2 were used to secure the 432,000 Level 1 keys K1. Where the data objects D have an average object size of about 30 kilobytes (kb) and storage costs of $0.15 per gigabyte (GB), the cost of storing the 440M data objects would be 440,000,000 objects*0.00003 GB*$0.15=$1980 per month (for storage costs). However, the average size of the objects D may be smaller than 30 kb after enabling compression in some embodiments. The costs for 3 read requests per second (RPS), at a read cost of $0.01 for 10,000 requests, would be 3 requests/second*60 seconds/minute*60 minutes/hour*24 hours/day*30 days/month=7,776,000 requests/month*0.000001 $/request=$7.776 per month (for read costs). With such a large number of data objects (440M), key rotation requires downloading, decrypting, re-encrypting, and uploading of the entire data set (e.g., all 440M data objects), which requires high network bandwidth and computing resources. In particular, in the present example, the cost of rotation of the Level 1 keys K1 (e.g., for reading, decryption, re-encryption, and re-writing of the 440M data objects D) at a write cost of $0.01 for 1,000 requests, would be 440M data objects*$0.01/10000 (read cost)+440M data objects*0.01/1000 (write cost)=440+4400=$4840. In comparison, the cost of rotation of the Level 2 keys K2 (e.g., for reading, decryption, re-encryption, and re-writing of the 432,000 Level 1 keys K1) at a write cost of $0.01 for 1,000 requests, would be 432000 keys*$0.01/10000 (read cost)+432000 keys*0.01/1000 (write cost)=0.432+4.32=$4.752. Thus, by lessening the frequency of rotation of the Level 1 keys K1, embodiments described herein may allow for significantly reduced costs, in particular as compared to that associated with data storage in an internal database system.

Embodiments described herein also provide advantages with respect to the amount of time required for key rotation. For example, in some embodiments, a service level agreement (SLA) in a three level hierarchy where the last level stores the data objects D may specify that Level 2 keys K2 should be rotated in 30 minutes (in case of a breach) or in 90 days (regularly). Benchmarking results in accordance with embodiments described herein showed that each of the virtual servers used (which have processing capabilities and other technical specifications consistent with current standards) was able to process about 60 reads per second (RPS). Thus, the 30 minute SLA for rotation of the Level 2 keys K2 can be met by using 4 of the virtual servers for a data set of 440M objects D. Also, the rotation process can be interleaved, so that the same hardware can be reused for rotating multiple data sources over the 90 day period. The SLA may further specify that Level 1 keys should be rotated every 3 to 5 years. Using the same configuration of 4 virtual servers, the rotation of the Level 1 keys K1 may be performed in about 21 days for the 440M objects D.

However, in some embodiments, the number of data objects D stored in the cloud may be about 1.5 billion, which is about 3.5 times the 440M objects of the above example. In such embodiments, downloading and re-encrypting the data objects D (e.g., to rotate the Level 1 keys K1) may take about one month at present. In particular, downloading and re-encrypting the Level 1 keys K1 may take approximately 84 days with 1 virtual server at present for 440M data objects. Thus, for the 1.5 billion objects, it will be 84*(1+3.5)=378 days. Therefore, about 13 virtual servers may be used to perform this within 1 month at present. By applying Moore's law, with the assumption that a benefit of about 50% can be achieved as abstracting continues (and thus computing resources become less efficient), there should be about a two-times improvement in performance every 4 years. Accordingly, over the next 15 years, about a 2^3=8 times improvement in computing resources may be expected.

Assuming the number of data objects D grows by 128 times over this same period, the total time taken 15 years from now to rotate the Level 1 keys K1 may be: 1 month*128/8=16 months. In other words, while rotating the Level 1 keys used to secure the current number of data objects may take about 1 month based on present computing resources, it is estimated that rotating the Level 1 keys may take about 16 months 15 years from now, based on a projected data growth of about 128 times over the next 15 years and taking into account improvements in computing technology. Thus, 16 times more hardware (16*13 virtual servers=208 virtual servers or their equivalent) may be required to rotate the Level 1 keys K1 in 15 years based on the expected data growth.

The above problems may be addressed in several ways. For example, the requirement of re-encrypting all data typically occurs in case of a breach. In embodiments described herein, the data objects may be distributed across multiple regions, in multiple buckets or groups, so that all of the re-encryption does not need to be performed at once. Additionally or alternatively, the re-encryption process may be parallelized, in order to achieve much higher throughput (for example, on the order of 30,000 RPS on a single bucket).

As shown above, the computational requirements for rotating the Level 1 keys K1 is significant, especially in light of expected data growth for cloud-based data storage. Accordingly, by lessening the frequency of rotation of the Level 1 keys K1, multi-level hierarchical key arrangements in accordance with embodiments described herein may significantly reduce this burden. Also, the hardware/computational requirements are lessened for higher levels of the hierarchy, as each level has fewer and fewer key objects to be rotated.

Accordingly, embodiments described herein provide a multi-level key-based encryption approach for storing large data sets in cloud using the standard or other algorithms. Such a multi-level key hierarchy allows for a reduced overall number of keys and the use of fewer computational resources, while still meeting existing standards or requirements for rotation, for example, as specified by a SLA. The encryption measures provided by embodiments described herein may also not compromise the reading/writing of SLAs to a data store.

Embodiments described herein may be implemented as a library, and may be used in moving previously-stored read-only data to help increase space in databases. Embodiments described herein may be designed for use with a variety of use cases. Implementation of embodiments described herein may be done in Java as a library, and the interfaces may conform to a Tiered Storage Framework (TSF).

Various embodiments have been described fully herein with reference to the accompanying figures, in which various embodiments are shown. This disclosure may, however, be embodied in many alternate forms and should not be construed as limited to the embodiments set forth herein.

Accordingly, while the disclosure is susceptible to various modifications and alternative forms, specific embodiments thereof are shown by way of example in the drawings and were described in detail herein. It should be understood, however, that there is no intent to limit the disclosure to the particular forms disclosed, but on the contrary, the disclosure is to cover all modifications, equivalents, and alternatives falling within the spirit and scope of the disclosure as defined by the claims. Like numbers refer to like elements throughout the description of the figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, integers, steps, operations, elements, and/or components, but do not preclude the presence or addition of one or more other features, integers, steps, operations, elements, components, and/or groups thereof. Moreover, when an element/step is referred to as being "responsive" to another element/step (and variants thereof), it can be directly responsive to the other element/step, or intervening elements/steps may be present. In contrast, when an element/step is referred to as being "directly responsive" to another element/step (and variants thereof), there are no intervening elements/steps present.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s)

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the present disclosure may be embodied in hardware and/or in software (including firmware, resident software, micro-code, etc.) that runs on a processor such as a digital signal processor, which may collectively be referred to as "circuitry," "a module," "an engine," or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Unless otherwise defined, all terms used herein have the same meaning as commonly understood by one of ordinary skill in the art to which this invention belongs. As used herein, the terms "present" or "provide" may refer to operations for transmitting data from one device to another, or to operations for displaying the data on an electronic device for viewing by a user. As used herein, a "wireless communication terminal" includes, but is not limited to, a device that is configured to receive/transmit communication signals via a wireless interface with, for example, a cellular network, a wireless local area network (WLAN), a satellite network, and/or another communication terminal. A wireless communication terminal may also be referred to as a "mobile terminal." Examples of wireless communication devices include, but are not limited to, a satellite or cellular radiotelephone or "smartphone" that can include a radiotelephone, Internet/intranet access, Web browser, and/or a global positioning system (GPS) receiver; and a conventional laptop and/or palmtop computer or other appliance that includes a radio transceiver.

Many different embodiments have been disclosed herein, in connection with the above description and the drawings. It will be understood that it would be unduly repetitious and obfuscating to literally describe and illustrate every combi- That which is claimed:

1. A computer implemented method for securing data objects in a cloud, the method comprising:
defining a hierarchy comprising encryption key objects associated with first and second levels of the hierarchy, wherein the second level comprises fewer of the encryption key objects than the first level;
dividing a plurality of data objects into data groups respectively including ones of the plurality of data objects;
assigning respective ones of the encryption key objects of the first level to the data groups;
encrypting the ones of data objects included in the data groups using the respective ones of the encryption key objects of the first level assigned thereto;
storing the plurality of data objects in a networked computer data storage responsive to the encrypting thereof;
dividing the encryption key objects of the first level into key groups respectively including one or more of the encryption key objects of the first level;
assigning respective ones of the encryption key objects of the second level to the key groups, wherein the one or more of the encryption key objects of the first level included in the key groups is configured to be decrypted using the respective one of the encryption key objects of the second level assigned thereto; and
rotating the encryption key objects of the second level in accordance with a requirement of a service level agreement without retrieving the plurality of data objects from the networked computer data storage.

2. The method of claim 1, wherein rotating the encryption key objects of the second level comprises:
retrieving the encryption key objects of the first level;
decrypting the one or more of the encryption key objects of the first level using the respective one of the encryption key objects of the second level assigned to the key groups thereof;
encrypting the encryption key objects of the first level using replacement encryption key objects associated with the second level; and
storing the encryption key objects of the first level in the networked computer data storage responsive to the encrypting thereof using the replacement encryption key objects associated with the second level.

3. The method of claim 1, further comprising:
rotating the encryption key objects of the first level less frequently than rotating the encryption key objects of the second level in accordance with the requirement of the service level agreement.

4. The method of claim 1, wherein the hierarchy further comprises encryption key objects associated with a third level of the hierarchy, wherein the third level comprises fewer of the encryption key objects than the second level, and further comprising:
dividing the encryption key objects of the second level into second key groups respectively including one or more of the encryption key objects of the second level;
assigning respective ones of the encryption key objects of the third level to the second key groups, wherein the one or more of the encryption key objects of the second level included in the second key groups is configured to be decrypted using the respective one of the encryption key objects of the third level assigned thereto; and
rotating the encryption key objects of the third level more frequently than rotating the encryption key objects of the second level in accordance with the requirement of the service level agreement and without retrieving the encryption key objects of the first level and/or the plurality of data objects.

5. The method of claim 1, further comprising:
receiving additional data objects;
dividing the additional data objects into additional data groups respectively including ones of the additional data objects;
dynamically generating additional encryption key objects associated with the first level responsive to receiving the additional data objects;
assigning respective ones of the additional encryption key objects of the first level to the additional data groups;
encrypting the ones of the additional data objects included in the additional data groups using the respective ones of the additional encryption key objects of the first level assigned thereto; and
storing the additional data objects in the networked computer data storage responsive to the encryption thereof without retrieving the plurality of data objects from the networked computer data storage.

6. A computer implemented method for securing data objects, the method comprising:
defining, via at least one of one or more computing devices, a hierarchy comprising encryption keys associated with different first and second levels of the hierarchy, wherein:
the first and second levels comprise ones of a number of levels of the hierarchy,
defining the hierarchy comprises dynamically altering a quantity of the encryption keys associated with the levels of the hierarchy to provide a desired key-to-data ratio,
the encryption keys of the first level secure a plurality of data objects, the plurality of data objects being stored in a networked computer data storage, and
the second level comprises fewer of the encryption keys than the first level;
grouping, via at least one of the one or more computing devices, the encryption keys of the first level into key groups respectively comprising one or more of the encryption keys of the first level;
securing, via at least one of the one or more computing devices, the one or more of the encryption keys of the first level included in the key groups with a respective one of the encryption keys of the second level; and
rotating, via at least one of the one or more computing device, the encryption keys of the second level without retrieving the plurality of data objects from the networked computer data storage.

7. The method of claim 6, further comprising:
grouping the plurality of data objects into data groups respectively comprising ones of the plurality of data objects;

securing the ones of the plurality of data objects included in the data groups with a respective one of the encryption keys of the first level; and storing the plurality of data objects in the networked computer data storage responsive to the securing thereof.

8. The method of claim 7, wherein rotating the encryption keys of the second level comprises:

retrieving the encryption keys of the first level without retrieving the plurality of data objects secured thereby from the networked computer data storage;

decrypting the one or more of the encryption keys of the first level included in the key groups using the respective one of the encryption keys of the second level;

dynamically generating replacement encryption keys associated with the second level; and encrypting the one or more encryption keys of the first level using a respective one of the replacement encryption keys associated with the second level.

9. The method of claim 8, wherein encrypting the one or more encryption keys of the first level using the respective one of the replacement encryption keys comprises:

encrypting the one or more of the encryption keys of the first level included in-the key groups using the respective one of the replacement encryption keys of the second level.

10. The method of claim 8, wherein encrypting the one or more encryption keys of the first level using the respective one of the replacement encryption keys comprises:

grouping the encryption keys of the first level into second key groups respectively comprising one or more of the encryption keys of the first level responsive to the decrypting; and encrypting the one or more of the encryption keys of the first level included in the second key groups using the respective one of the replacement encryption keys of the second level.

11. The method of claim 7, further comprising:

rotating the encryption keys of the first level less frequently than rotating the encryption keys of the second level in accordance with a service level agreement.

12. The method of claim 7, wherein the hierarchy further comprises encryption keys associated with a third level of the hierarchy, wherein the third level comprises fewer of the encryption keys than the second level, and further comprising:

grouping the encryption keys of the second level into second key groups respectively including one or more of the encryption keys of the second level; and securing the one or more of the encryption keys of the second level included in the second key groups with a respective one of the encryption keys of the third level.

13. The method of claim 12, further comprising:

rotating the encryption keys of the third level more frequently than rotating the encryption keys of the second level in accordance with a service level agreement and without retrieving the encryption keys of the first level.

14. The method of claim 7, further comprising:

receiving additional data objects;

grouping the additional data objects into additional data groups respectively comprising ones of the additional data objects;

securing the ones of the additional data objects included in the additional data groups using a respective one of the encryption keys of the first level; and storing the additional data objects in the networked computer data storage responsive to the securing thereof and without retrieving the plurality of data objects from the networked computer data storage.

15. The method of claim 14, further comprising the following prior to securing the ones of the additional data objects:

dynamically generating additional encryption keys; and associating respective ones of the additional encryption keys with the first or second levels without retrieving the encryption keys of the first or second levels such that the encryption keys of the first or second levels comprise the respective ones of the additional encryption keys.

16. The method of claim 6, wherein defining the hierarchy further comprises:

dynamically adjusting the number of levels of the hierarchy based on the desired key-to-data ratio.

17. The method of claim 6, wherein the key-to-data ratio differs according to a type of data and/or a security level associated with one or more of the plurality of data objects.

18. A system for securing data objects, the system comprising:

at least one computing device configured to implement one or more services, wherein the one or more services are configured to:

define a hierarchy comprising encryption keys associated with different first and second levels of the hierarchy, wherein:

the first and second levels comprise ones of a number of levels of the hierarchy, the one or more services are further configured to dynamically adjust at least one of the number of levels of the hierarchy or a quantity of the encryption keys associated with the levels of the hierarchy to provide a desired key-to-data ratio, the second level comprises fewer of the encryption keys than the first level, and the encryption keys of the first level secure a plurality of data objects stored in a networked computer data storage;

group the encryption keys of the first level into key groups respectively comprising one or more of the encryption keys of the first level, and secure the one or more of the encryption keys of the first level included in the key groups with a respective one of the encryption keys of the second level; and rotate the encryption keys of the second level without retrieving the plurality of data objects from the networked computer data storage.

19. The system of claim 18, wherein the one or more services are further configured to group the plurality of data objects into data groups respectively comprising ones of the plurality of data objects, secure the ones of the plurality of data objects included in the data groups with a respective one of the encryption keys of the first level, and store the plurality of data objects in the networked computer data storage responsive to the securing thereof.

20. The system of claim 18, wherein the one or more services are further configured to retrieve the encryption keys of the first level and generate replacement encryption keys associated with the second level, and wherein the one or more services are further configured to decrypt the one or more of the encryption keys of the first level included in the key groups using the respective one of the encryption keys of the second level, and encrypt the one or more encryption keys of the first level using the replacement encryption keys associated with the second level to rotate the encryption keys of the second level.

21. The system of claim 18, wherein the one or more services are further configured to rotate the encryption keys of the first level less frequently than rotating the encryption keys of the second level in accordance with a service level agreement.

22. The system of claim 18, wherein the hierarchy further comprises encryption keys associated with a third level of the hierarchy, wherein the third level comprises fewer of the encryption keys than the second level, and
wherein the one or more services are further configured to group the encryption keys of the second level into second key groups respectively including one or more of the encryption keys of the second level, and to secure the one or more of the encryption keys of the second level included in the second key groups with a respective one of the encryption keys of the third level.

23. The system of claim 22, wherein the one or more services are further configured to rotate the encryption keys of the third level more frequently than rotating the encryption keys of the second level in accordance with a service level agreement and without retrieving the encryption keys of the first level.

24. The system of claim 19, wherein, responsive to receipt of additional data objects, the one or more services are further configured to group the additional data objects into additional data groups respectively comprising ones of the additional data objects, secure the ones of the additional data objects included in the additional data groups using a respective one of the encryption keys of the first level; and store the additional data objects in the networked computer data storage-responsive to the securing thereof and without retrieving the plurality of data objects from the networked computer data storage.

25. The system of claim 24, wherein the one or more services are further configured to dynamically generate additional encryption keys and associate respective ones of the additional encryption keys with the first or second levels prior to securing the ones of the additional data objects without retrieving the encryption keys of the first or second levels.

* * * * *